United States Patent [19]
Williams

[11] Patent Number: 4,607,665
[45] Date of Patent: Aug. 26, 1986

[54] PIPE SPACER

[75] Inventor: Samuel B. Williams, Culver City, Calif.

[73] Assignee: Marco Manufacturing, Inc., Lynwood, Calif.

[21] Appl. No.: 735,681

[22] Filed: May 20, 1985

[51] Int. Cl.⁴ .............................................. F16L 9/02
[52] U.S. Cl. ........................................ 138/148; 98/60; 138/149
[58] Field of Search ................... 98/60, 58; 138/112, 138/114, 148, 149

[56] References Cited

U.S. PATENT DOCUMENTS

| | | | |
|---|---|---|---|
| 2,875,987 | 3/1959 | La Valley | 138/112 X |
| 2,962,053 | 11/1960 | Epstein | 138/148 X |
| 3,110,324 | 11/1963 | De Haan | 138/148 |
| 3,467,143 | 9/1969 | Croft | 138/148 X |
| 4,448,219 | 5/1984 | van Hatten | 138/149 |
| 4,456,058 | 6/1984 | Powell | 138/148 X |
| 4,573,400 | 3/1986 | Foy | 98/60 |

FOREIGN PATENT DOCUMENTS

| | | | |
|---|---|---|---|
| 2161839 | 6/1973 | Fed. Rep. of Germany | 138/148 |
| 2207924 | 8/1973 | Fed. Rep. of Germany | 138/148 |

Primary Examiner—Stephen Marcus
Assistant Examiner—Mark Thronson
Attorney, Agent, or Firm—Blakely Sokoloff Taylor & Zafman

[57] ABSTRACT

A mechanical spacer for holding an inner pipe fixed in place within an encasing outer pipe in a multiple wall pipe assembly. The spacer functions in place of a bracket in a double wall-chimney pipe assembly. The unitary spacer requires no external hardware nor requires welding, screwing, riveting or the like step in the manufacturing or assembly of the pipe assembly.

18 Claims, 8 Drawing Figures

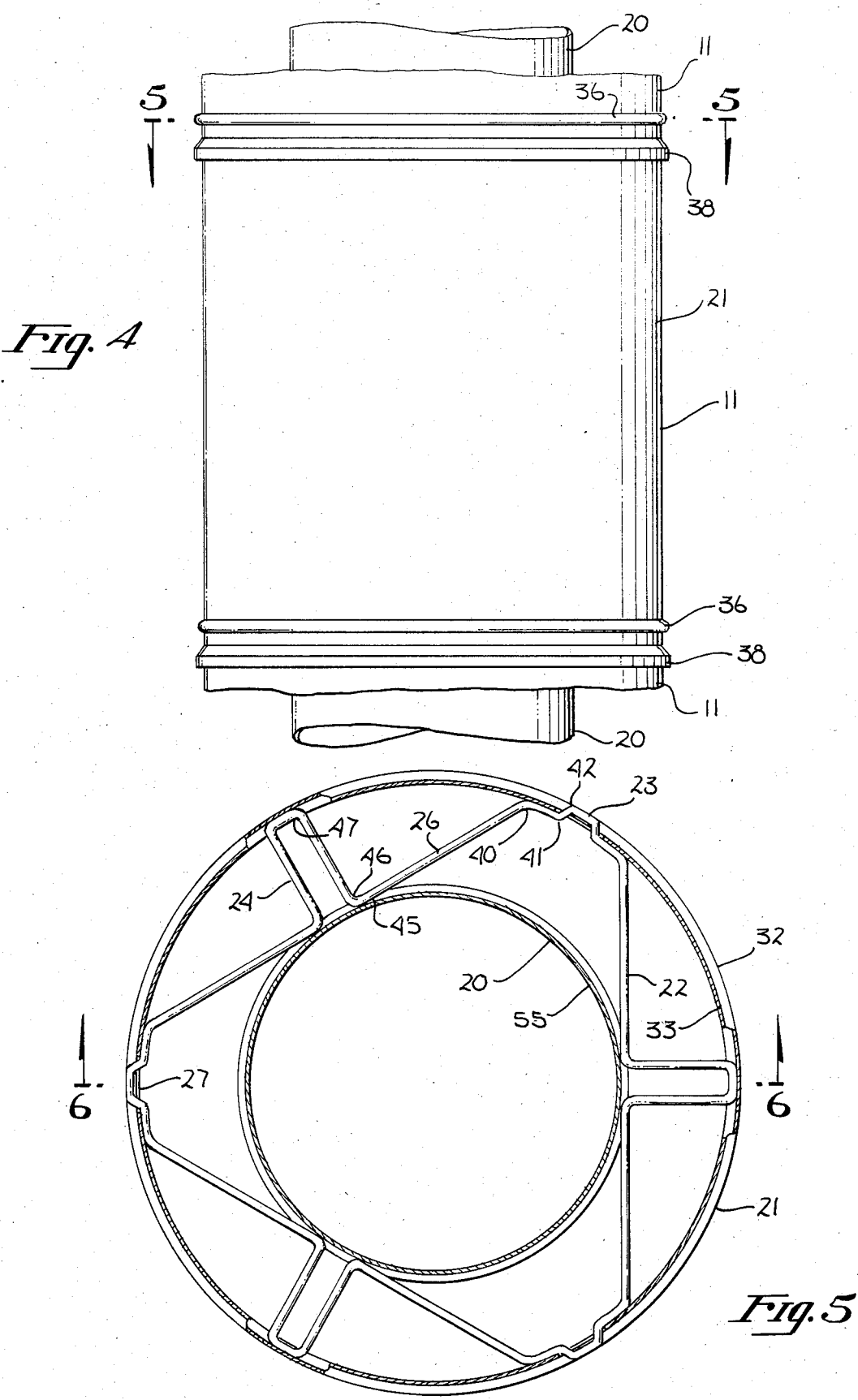

PIPE SPACER

BACKGROUND OF THE INVENTION

1. Field of the Invention

This invention relates generally to pipe assemblies and more specifically to encasing a pipe within another pipe in a multiple-wall pipe structure.

2. Art Background

Pipes comes in many different shapes and sizes for a myriad of functions. One particular class of pipes relates to multiple-wall pipes having an inner pipe encased within one or more outer pipes. The purpose of such multi-wall pipe usually stems from a need to provide some form of insulation between the fluid carrying medium and the outside environment.

In a double-wall pipe, the fluid medium travels within the confinement of an inner pipe or tube. An outer pipe encases the inner pipe in such a manner as to shield the inner pipe from the outside environment. An insulation barrier normally exists between the inner pipe and the outer pipe. The amount of insulation primarily depends upon the distance separating the exterior wall of the inner pipe from the interior wall of the outer pipe and also the material used as the insulator.

In a double-wall chimney pipe intended for use as an exhaust medium for the device such as a stove, oven, heater or fireplace, heated exhaust gases, as well as solid particles generated by the fuel oxidized in the device, travel through the inner pipe to the outside environment, which is usually the atmosphere. Mostly due to convection the inner pipe will increase significantly in temperature. The insulating material between the inner pipe and the outer pipe must reduce the temperature present at the exterior wall of the outer pipe from that present at the outer surface of the inner pipe. In many instances, flammable mateiral, such as wood which is used in residential buildings, make direct contact or are in near proximity to the pipe assembly and safety reasons require isolation as well as insulation of the heated inner pipe.

When the insulating material consists of solid matter, the solid structure of the material may provide the support necessary to hold the inner pipe in a fixed position within the outer pipe. However, when gaseous material, such as air, provides the insulating medium, some mechanical means are necessary to hold the inner pipe in a fixed position within the outer pipe.

Prior art double-walled chimney pipes used mechanical brackets which hold the inner pipe in place. Such a prior art bracket requires welds, screws, rivets or the like for mounting it to the inner and outer pipes. Hence, a prior art bracket will usually require extraneous hardware components, such as screws and rivets, and will always require an assembly step of welding, screwing, riveting, or the like during the manufacturing process of the chimney assembly.

Inasmuch as most chimney systems entail the need for long sections of pipe, as well as a requirement for bends in the system, flexibility requires manufacturers to sell chimney pipes in sections. Manufacturing of appropriate lengths of pipe, as well as elbows, will allow a builder to select the necessary sections to complete the builder's required chimney system. However, any effort exerted by a worker in mounting a bracket to a chimney pipe detracts from the optimum efficiency of the chimney system construction. A rapid assembling technique allows workers to construct a chimney system in a minimum amount of time.

As will be described, an improved pipe spacer is provided which has particular utility for use in fireplace chimney applications.

SUMMARY OF THE INVENTION

The primary object of the present invention is a pipe spacer which holds an inner pipe fixed in place within an encasing outer pipe in a multiple-wall pipe assembly.

A further object of the present invention is to provide a unitary mechanical pipe spacer which can provide mechanical support and spacing of the pipes.

A further object of the present invention is to provide a pipe spacer which requires no extraneous hardware for mounting such a spacer.

A still further object of the present invention is to provide a pipe spacer such that assembling a pipe system utilizing the pipe spacer requires no welding, screwing, riveting or the like in the manufacturing or assembly of such a pipe system.

Yet another object of the present invention is to provide a simple, flexible system for connecting pipe sections into a complete operable system.

The present invention provides a simple unitary pipe spacer which holds an inner pipe fixed in place within an encasing outer pipe in a multiple-wall pipe assembly, and particularly in a double-wall chimney pipe assembly. The spacer requires no extraneous mounting hardware, nor welding, screwing, riveting or the like step in the manufacturing or assembly of the pipe assembly. A completed pipe assembly consists of the inner pipe, outer pipe, and the spacer in such a way as to facilitate the ease in connecting together additional such pipe assemblies to form a complete pipe system.

BRIEF DESCRIPTION OF THE DRAWINGS

FIG. 4 is a front view of the pipe assembly.

FIG. 5 is a top view of the pipe assembly.

DESCRIPTION OF A PREFERRED EMBODIMENT

A preferred embodiment of the present invention relates to a double wall-chimney pipe wherein individual pipe sections are connected together to form a desired chimney system. In the following description, numerous specific details are set forth such as geometric shapes, sizes, dimensions, etc., in order to provide a thorough understanding of the present invention. However, it will be appreciated to one skilled in the art that the present invention may be practiced without these specific details.

Figure 1:
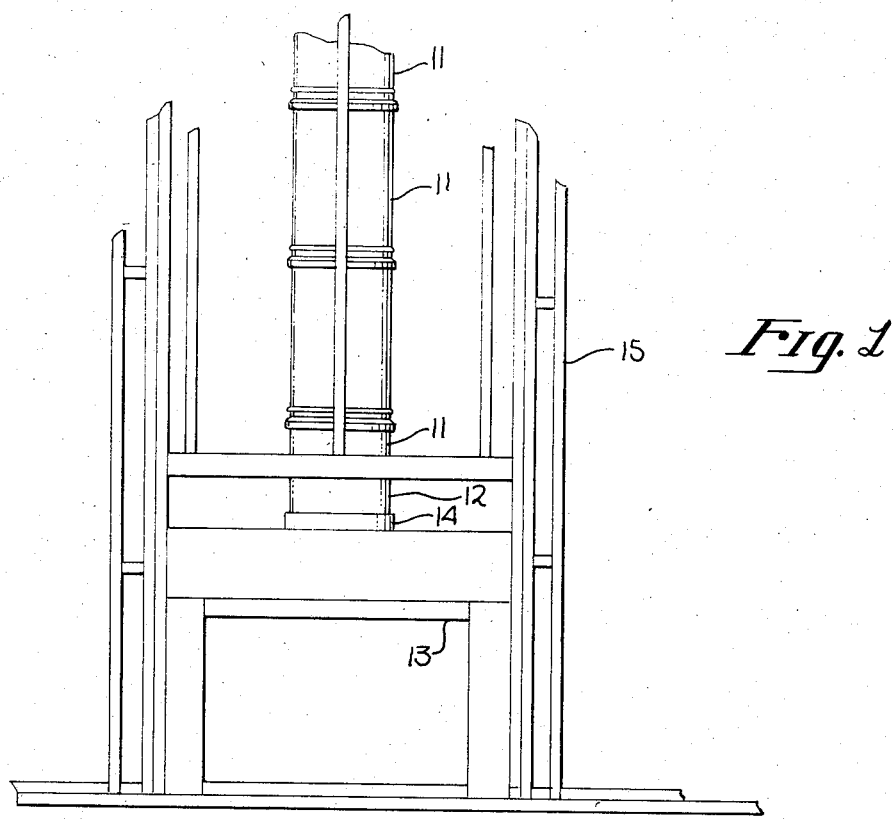
FIG. 1 is a pictorial view of a fireplace and pipe chimney surrounded by a wood frame structure.

FIG. 1 illustrates a setting in which the preferred embodiment of the present invention is in usage. Completed pipe assemblies 11 are interlocked together to form a chimney system. The last chimney section 12 interlocks to an exhaust neck 14 of a fireplace 13. As illustrated, the completed chimney system along with a fireplace 13 is installed into a framework 15 of a building or a house.

Figure 2:
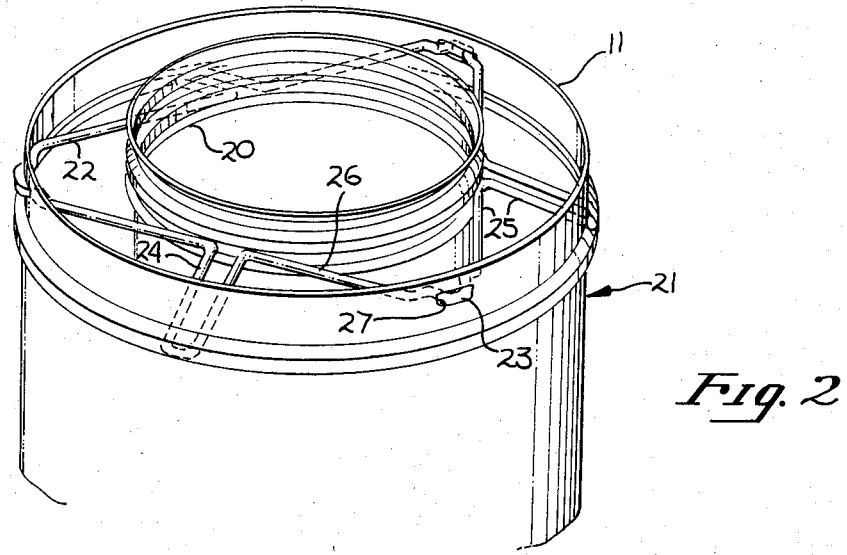
FIG. 2 is a pictorial view of a completed pipe assembly.

Referring now to FIG. 2, there is illustrated a completed pipe assembly 11, consisting of an inner pipe 20, outer pipe 21, and spacer 22. The inner pipe 20 and outer pipe 21 are formed by cutting a flat piece of material, bending this material at certain appropriate locations and then connecting two opposite edges to form a hollow cylinder. However, other manufacturing processes are applicable in providing similar cylinders. The spacer 22 is made from a number of rods which are formed and then welded basically into a triangular shape. The elongated member 26 form the sides of the triangle and a nib 23 is formed at the three apexes of the triangular shape of the spacer 22. In the present embodiment, the nibs 23 and the elongated members 26 of the spacer 22 all lie within a single plane. Equidistant between each nib 23, the spacer 22 is bent to form a tongue 24, which extends at an angle 25 from the plane of the triangle formed by the elongated members 26 and nibs 23. The inner pipe 20 fits within the enclosed area formed by the spacer 22 and the outer pipe 21 fits around the spacer 22 wherein the nibs 23 extend through openings 27 on the outer pipe 21.

FIG. 5 shows a top view of the pipe assembly 11 and better illustrates the bends forming the spacer. Spacer 22 is formed by the elongated member 26 bent inward to form a bend 40 wherein the spacer 22 makes contact with the outer pipe 21. The spacer 22 then bends outward to form a bend 41 where the spacer 22 passes through the opening 27 and bends inward to form a bend 42 to form the nib 23. The elongated member 26 makes contact with the inner pipe 20 prior to bending outward to form a bend 46; extends downward to form an angle 25; bends inward to form a bend 47 when making contact with outer pipe 21; and thereby forming a tongue 24. The forming procedure is repeated to form the complete spacer 22.

Figure 3:
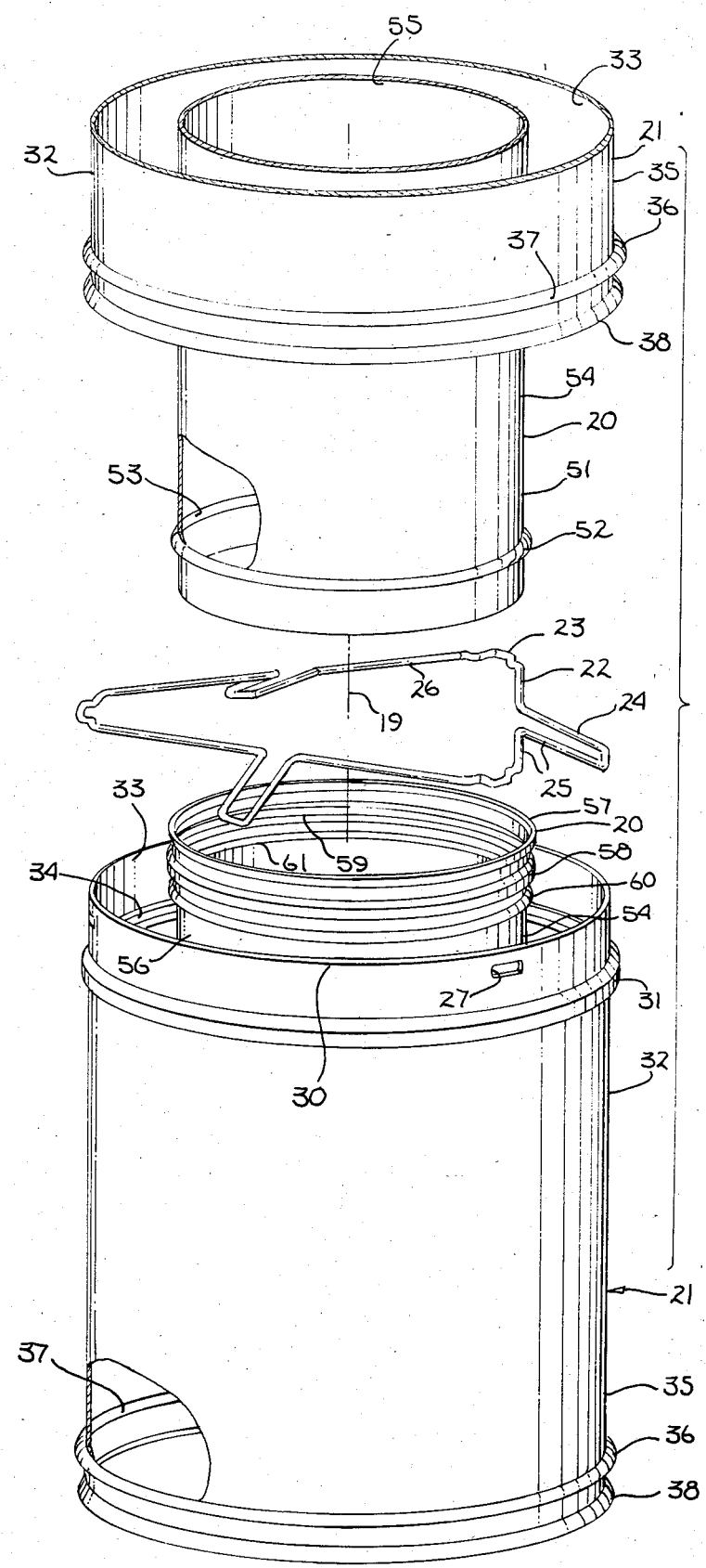
FIG. 3 is an exploded view of the pipe assembly.

FIG. 3 is an exploded view illustrating the inner pipe 20, outer pipe 21 and spacer 22. Inserting end 30 of the outer pipe 21 contains 3 openings 27, spaced equidistant around the circumference of the outer pipe 21. The inserting end 30 also contains a ridge 31 which rises beyond the exterior surface 32 of the outer pipe 21. A groove 34 forms on the interior surface 33 of the outer pipe 21, due to the outward projection caused by the formation of ridge 31. External end 35 of the outer pipe 21, which is also shown in the drawing above the spacer 22, contains an extruding ridge 36 running around the exterior circumference of the outer pipe 21. A groove 37 forms on the interior surface 33 of the outer pipe 21, such groove 37 formed due to the outward projection caused by the formation of ridge 36. A rim 38 flared outward at an angle rising above the exterior surface 32 and circumscribing the outer pipe 21, terminates the external end 35.

Inserting end 51 of the inner pipe 20 contains a ridge 52 which circumscribes the exterior surface 54 of the inner pipe 20. A groove 53 forms on the interior surface 55 of the inner pipe 20 due to the outward projection caused by the formation of the ridge 52. A rim 57 flared at an angle rising above the exterior surface 54 and circumscribing the inner pipe 20 terminates the external end 56. A ridge 58 rising above the exterior surface 54 of the external end 56 circumscribes the inner pipe 20. A groove 59 forms on the interior surface 55 due to the outward projection caused by the formation of the ridge 58. A ridge 60 located farther in from the rim 59 than ridge 58 in rising above the exterior surface 54 of the external end 56, also circumscribes the inner pipe 20. A groove 61 forms on the interior surface 55 due to the outward projection caused by the formation of the ridge 60.

The inserting end 30 of the outer pipe 21 has a diameter slightly smaller than the diameter of the external end 35 of the outer pipe 21 such that the inserting end 30 of one pipe section will insert into the external end 35 of another pipe section, thereby interconnecting two outer pipe sections. Similarly, the inserting end 51 of the innper pipe 20 has a diameter slightly smaller than the diameter of the external end 56 of the inner pipe 20 such that the inserting end of one pipe section will insert into the external end of another pipe section, thereby interconnecting two inner pipe sections. FIG. 4 depicts a frontal view of a pipe assembly 11 joined to two other pipe assemblies 11.

Figure 6:
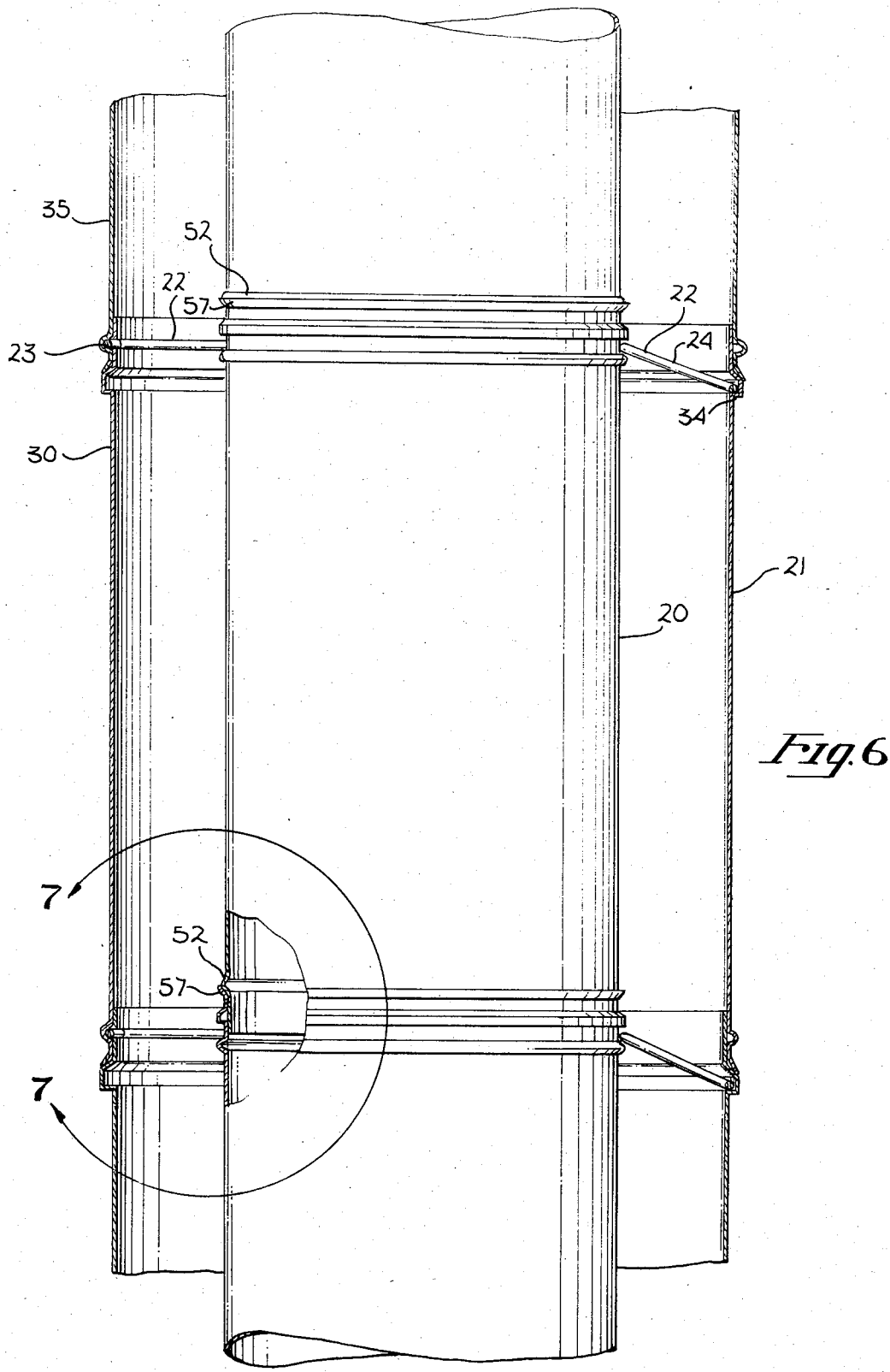
FIG. 6 is a cross-sectional view of the pipe assembly.
Figure 7:
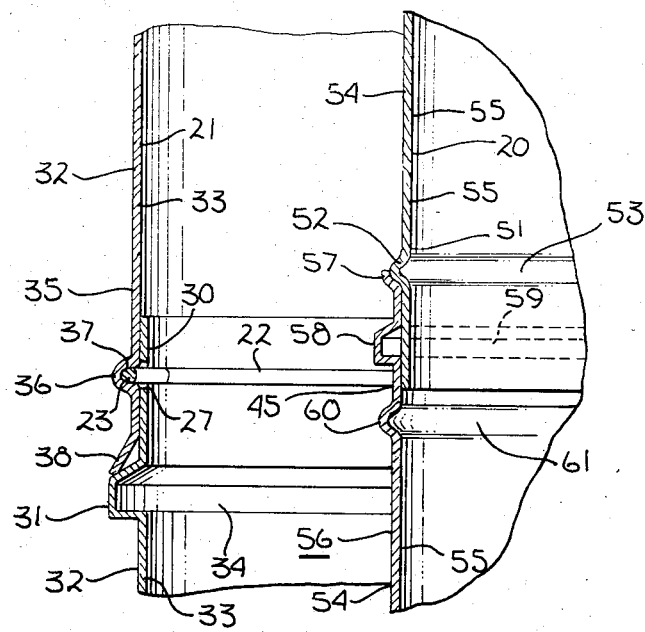
FIG. 7 is an enlarged cross-sectional view of the joint portion of the pipe assembly.

FIG. 5 shows the position of the inner pipe 20, outer pipe 21 and the spacer 22 relative to each other when properly assemblied. FIG. 6 and FIG. 7 show in detail the position of the three elements in a completely assembled pipe assembly 11 and when interconnected to another pipe assembly section. Ends 45 of the elongated members 26 rests between the ridges 58 and 60, the ridges 58 and 60 preventing the movement of the end 45 from traversing on the exterior surface 54 beyond the limits of the ridges 58 and 60 and thereby coupling the spacer 22 to the inner pipe 20. The nib 23 is inserted into the opening 27 such that the nib 23 extends past the opening 27 and beyond the exterior surface 32 thereby coupling the spacer 22 to the outer pipe 21. In addition, tongue 24, extending at an angle 25 fits into groove 34, wherein tongue 24 provides coupling between the spacer 22 and the outer pipe 21 and further supporting the mechanical integrity of the coupling by prohibiting the outer pipe 21 and inner pipe 20 from shifting in relation to each other along a central axis 19 (see FIG. 3).

FIG. 7 shows an enlargement of the interconnection of two pipe assemblies 11. In reference to the interpipe interconnection, inserting end 51 inserts into external end 56. The inserting end 51 is forced into the external end 56 until ridge 52 comes to rest on rim 57. Simultaneously, the external end 35 is forced over the inserting end 30 until the nib 23 projecting past the opening 27 snaps into the groove 37. Note that only one spacer 22 attaches to each pipe assembly 11 and the spacer 22 couples the inserting end 30 of the outer pipe 21 to the external end 56 of the inner pipe 20. The opposite end of the pipe assembly does not contain a spacer 22, but receives proper positioning and spacing when interconnected to another pipe assembly 11.

Figure 8:
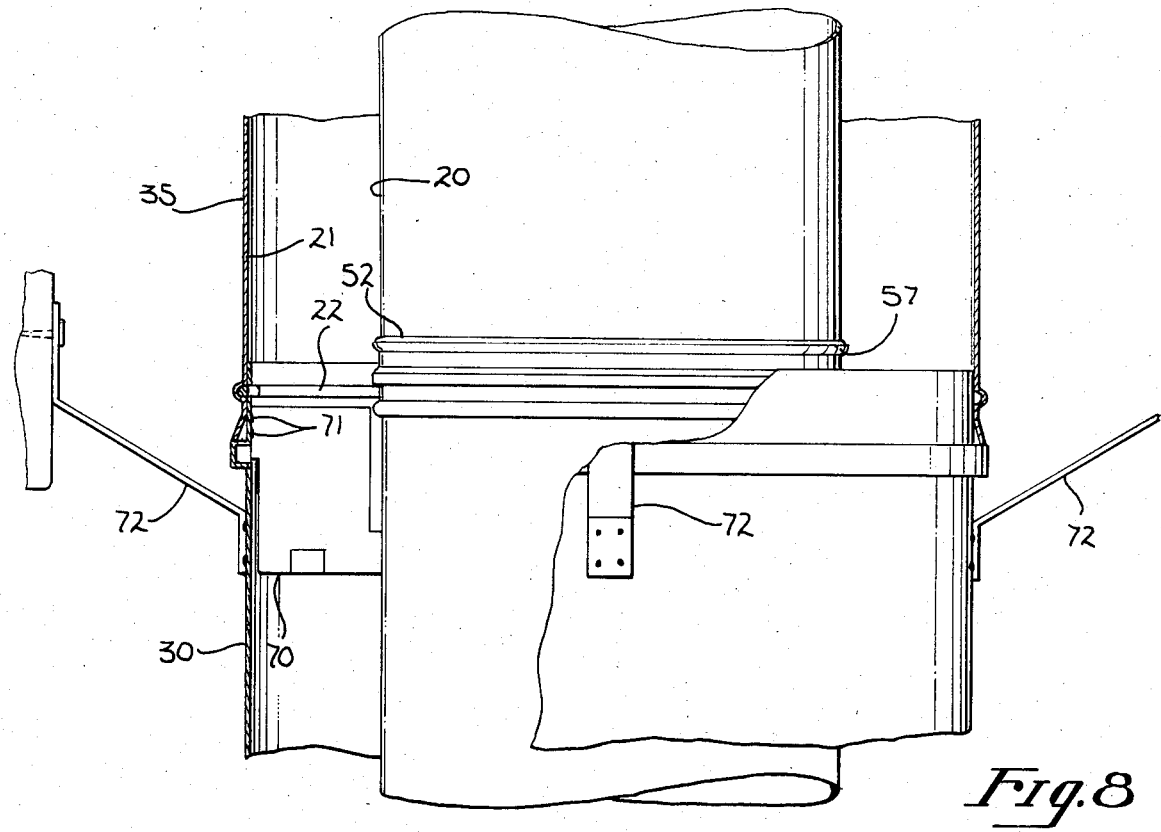
FIG. 8 is a cut-away view of a pipe support assembly.

FIG. 8 illustrates an alternative embodiment wherein external support brackets located at certain strategic locations along a completed chimney system anchor the chimney system to a fixed object. The cut-away of FIG. 8 shows a supporting member 70 inserted between the inner pipe 20 and the outer pipe 21 and placed in a fixed position by welds 71. The supporting member 70 provides mechanical rigidity attaching brackets 71 by welds to the outer pipe 21.

It is therefore apparent that the present invention accomplishes its intended objects. While an embodiment of the present invention has been described in detail, this is for the purpose of illustration, not limitation. Those skilled in the art will realize that many variations and modifications can be made to produce the described invention and still be within the spirit and scope of the claimed invention.

I claim:

1. A multiple wall pipe for conveying and isolating a gas flow, comprising:
   a first outer pipe;
   a second inner pipe for containing said gas flow, said second pipe being disposed within said outer pipe;
   a spacer formed from a rod having a plurality of predetermined bends; said rod forming a closed perimeter around said second pipe and contacting the inner wall of said first pipe such that said second pipe is ridgedly held at a predetermined location within said first pipe;
   said rod being formed into a shape including a plurality of apices, wherein said apices are for coupling said spacer to said first pipe, and portions of said rod between said apices are utilized for coupling said spacer to said second pipe, such that said spacer clamps said second pipe at said predetermined position within said first pipe;
   said second pipe including a plurality of ridges on an exterior surface such that said portions of said rod between said apices is utilized for coupling said second pipe between said ridges, thereby providing further mechanical coupling support of said first pipe to said second pipe.

2. The pipe as defined in claim 1, wherein said first pipe includes openings through the side walls of said first pipe, and said apices each include a projection extending into and through said openings of said first pipe, thereby providing further mechanical coupling support of said second pipe to said first pipe.

3. The pipe as defined by claim 2, wherein each portion of said rod between said apices includes an elongation extending from said second pipe to said first pipe.

4. The pipe as defined by claim 3, wherein said first pipe includes a groove on an interior surface such that each said elongation extending from said second pipe to said first pipe terminates in said groove.

5. The pipe as defined by claim 4, wherein said apices all lie on a same first plane.

6. The pipe as defined by claim 5, each said elongation extends at an angle from said first plane and terminating on a second plane.

7. The pipe as defined by claim 6 wherein said first pipe and said second pipe define a double-wall chimney pipe.

8. A conduit for conveying and isolating a fluid flow, comprising:
   a first outer cylinder;
   a second inner cylinder for containing said fluid flow, said second pipe being disposed within said first outer cylinder;
   a spacer formed from a rod having a plurality of predetermined bends, said rod forming a closed perimeter around said second cylinder and contacting the inner wall of said first cylinder, such that said second cylinder is rigidly held at said predetermined location within said first cylinder, said rod having a shape including a plurality of apices, wherein said apices are for coupling said spacer to said first cylinder and portions of said rod between said apices for coupling said spacer to said second cylinder, such that said spacer clamps said second cylinder at a predetermined position within said first cylinder;
   said second cylinder including a plurality of ridges on an exterior surface, such that portion portions of said rod between said apices couples to said second cylinder between said ridges.

9. The conduit as defined by claim 8, wherein said first cylinder includes openings through the side walls of said cylinder, and said apices each include a first projection extending into and through said openings in said first cylinder, thereby providing further mechanical coupling support of said first cylinder to said second cylinder.

10. The conduit as defined by claim 9, wherein said first cylinder further includes a groove on an interior surface, said portions each including a second projection, said second projection extending into said grooves.

11. The conduit as defined by claim 10, wherein each portion of said rod between said apices includes an elongation extending from said second cylinder to said first cylinder.

12. The conduit as defined by claim 11, wherein said first cylinder includes a groove on an interior surface such that each said elongation extending from said second cylinder to said first cylinder terminates in said groove.

13. The conduit as defined by claim 12, wherein said apices all lie on a same first plane.

14. The conduit as defined by claim 13, wherein each of said elongations extend at an angle from said first plane and terminate on a second plane.

15. The conduit as defined in claim 14, wherein each of said apices are separated equaidistant from adjacent apices.

16. The conduit as defined by claim 15, wherein each of said elongations are separated equidistant from adjacent apices.

17. The conduit as defined by claim 16, wherein said spacer has three apices and three elongations.

18. The conduit as defined by claim 17, wherein said first cylinder and said second cylinder define a double-wall chimney pipe.

* * * * *